United States Patent
Theobald

(10) Patent No.: US 8,806,324 B2
(45) Date of Patent: Aug. 12, 2014

(54) ANNOTATION DATA FILTERING OF COMPUTER FILES

(75) Inventor: Dietmar Theobald, Karlsruhe (DE)

(73) Assignee: SAP AG, Walldorf (DE)

( * ) Notice: Subject to any disclaimer, the term of this patent is extended or adjusted under 35 U.S.C. 154(b) by 1022 days.

(21) Appl. No.: 12/184,915

(22) Filed: Aug. 1, 2008

(65) Prior Publication Data

US 2009/0037805 A1 Feb. 5, 2009

Related U.S. Application Data

(60) Provisional application No. 60/953,937, filed on Aug. 3, 2007, provisional application No. 60/953,932, filed on Aug. 3, 2007, provisional application No. 60/953,933, filed on Aug. 3, 2007, provisional application No. 60/953,935, filed on Aug. 3, 2007, provisional application No. 60/953,938, filed on Aug. 3, 2007, provisional application No. 60/953,963, filed on Aug. 3, 2007, provisional application No. 60/953,964, filed on Aug. 3, 2007.

(51) Int. Cl.
*G06F 17/00* (2006.01)

(52) U.S. Cl.
USPC ........... 715/230; 715/233; 717/108; 707/736; 707/754

(58) Field of Classification Search
CPC ................... G06F 17/30525; G06F 17/30091; G06F 17/30073
USPC .................................. 715/230, 231, 232, 233
See application file for complete search history.

(56) References Cited

U.S. PATENT DOCUMENTS

| | | | |
|---|---|---|---|
| 4,760,523 A * | 7/1988 | Yu et al. ................................. 1/1 |
| 5,907,703 A * | 5/1999 | Kronenberg et al. .......... 719/321 |
| 6,182,281 B1 * | 1/2001 | Nackman et al. .............. 717/116 |
| 6,275,223 B1 * | 8/2001 | Hughes .......................... 715/751 |
| 6,353,925 B1 * | 3/2002 | Stata et al. ...................... 717/112 |
| 6,356,946 B1 * | 3/2002 | Clegg et al. ................... 709/231 |
| 6,567,815 B1 | 5/2003 | Rubin et al. |
| 6,675,375 B1 * | 1/2004 | Czajkowski .................. 717/151 |
| 6,694,323 B2 | 2/2004 | Bumbulis |
| 6,856,993 B1 | 2/2005 | Verma et al. |
| 7,318,193 B2 * | 1/2008 | Kim et al. ...................... 715/233 |
| 7,376,831 B2 * | 5/2008 | Kollmyer et al. .............. 713/154 |
| 7,499,956 B1 * | 3/2009 | Darcy et al. ........................... 1/1 |
| 7,562,342 B2 * | 7/2009 | Berg et al. ...................... 717/108 |
| 7,565,364 B1 * | 7/2009 | Darcy et al. ........................... 1/1 |
| 7,668,812 B1 * | 2/2010 | Riley et al. .................... 707/754 |

(Continued)

OTHER PUBLICATIONS

Eclipse "Source viewers and annotations," Oct. 30, 2003, pp. 1-6 http://help.eclipse.org/juno/index.jsp?topic=%2Forg.eclipse.platform.doc.isv%2Fguide%2Feditors_annotations.htm.*

(Continued)

*Primary Examiner* — Stephen Hong
*Assistant Examiner* — Mario M Velez-Lopez
(74) *Attorney, Agent, or Firm* — Schwegman, Lundberg & Woessner, P.A.

(57) ABSTRACT

A method and apparatus for annotation filtering of computer files. An embodiment of a method for annotation filtering of computer files includes receiving a serial data stream input, where the serial data stream input representing one or more computer files. A data type description of a computer file is detected in the data stream, and an annotation is detected in the computer file. A determination is made whether to continue processing of the annotation.

15 Claims, 10 Drawing Sheets

(56) References Cited

U.S. PATENT DOCUMENTS

| | | | |
|---|---|---|---|
| 7,685,327 B1* | 3/2010 | Jacobson et al. | 710/10 |
| 7,966,602 B1* | 6/2011 | Webster et al. | 717/114 |
| 8,141,036 B2* | 3/2012 | Wagner et al. | 717/113 |
| 8,271,942 B2* | 9/2012 | Nigul et al. | 717/108 |
| 8,438,468 B2* | 5/2013 | Berg et al. | 715/230 |
| 8,463,724 B2* | 6/2013 | Theobald | 706/45 |
| 2002/0178439 A1* | 11/2002 | Rich et al. | 717/174 |
| 2003/0018614 A1* | 1/2003 | Hayes et al. | 707/1 |
| 2004/0049371 A1* | 3/2004 | Fraer et al. | 703/14 |
| 2004/0088681 A1* | 5/2004 | Berg et al. | 717/120 |
| 2004/0093329 A1 | 5/2004 | Von Bergen et al. | |
| 2004/0111701 A1* | 6/2004 | Beust | 717/108 |
| 2004/0123285 A1* | 6/2004 | Berg et al. | 717/174 |
| 2004/0249805 A1 | 12/2004 | Chuvilskiy | |
| 2004/0267732 A1 | 12/2004 | Luk et al. | |
| 2005/0033740 A1 | 2/2005 | Cao et al. | |
| 2005/0131867 A1 | 6/2005 | Wilson | |
| 2005/0187962 A1* | 8/2005 | Grondin et al. | 707/102 |
| 2005/0216445 A1* | 9/2005 | Rao | 707/3 |
| 2005/0275603 A1* | 12/2005 | Park | 345/1.1 |
| 2006/0020645 A1* | 1/2006 | Hasegawa et al. | 707/204 |
| 2006/0179087 A1 | 8/2006 | Fujii et al. | |
| 2007/0038610 A1* | 2/2007 | Omoigui | 707/3 |
| 2008/0235661 A1* | 9/2008 | Arpana et al. | 717/116 |
| 2008/0244537 A1* | 10/2008 | Wintergerst et al. | 717/130 |
| 2009/0007195 A1* | 1/2009 | Beyabani | 725/86 |
| 2009/0024604 A1* | 1/2009 | Zhao et al. | 707/5 |
| 2009/0037357 A1* | 2/2009 | Theobald | 706/46 |
| 2009/0037804 A1* | 2/2009 | Theobald | 715/230 |
| 2011/0022941 A1* | 1/2011 | Osborne et al. | 715/230 |

OTHER PUBLICATIONS

"A Program Annotation Facility for the Java Programming Language" *JSR-175 Public Draft Specifiation*, (2002-2003), 1-34.

"Getting Started with the Annotation Processing Tool (apt)", http://java.sun.com/j2se/1.5.0/docs/guide/apt/GettingStarted.html, (2004), 1-8.

"Package—Java 2 Platform Standard Edition Version 1.4.2", http://java.sun.com/j2se/1.42/docs/api/java/io/packaqe-summary.html, 2003 , 1-6.

Gosling, James , et al., "The Java Language Specification Third Edition", *Addison Wesley* -, (May 2005), 259-286 & 356-358.

USPTO, "6570P471 OA Mailed Oct. 29, 2008 for U.S. Appl. No. 11/648,065", (Oct. 29, 2008), Whole Document.

U.S. Appl. No. 12/184,896, Final Office Action mailed Apr. 24, 2012, 23 pgs.

U.S. Appl. No. 12/184,896, Non Final Office Action mailed Sep. 7, 2011, 25 pgs.

U.S. Appl. No. 12/184,896, Non Final Office Action mailed Oct. 26, 2012, 15 pgs.

U.S. Appl. No. 12/184,896, Notice of Allowance mailed Feb. 8, 2013, 5 pgs.

U.S. Appl. No. 12/184,896, Response filed Jan. 24, 2013 to Non Final Office Action mailed Oct. 26, 2012, 13 pgs.

U.S. Appl. No. 12/184,896, Response filed Jul. 25, 2012 to Final Office Action mailed Apr. 24, 2012, 12 pgs.

U.S. Appl. No. 12/184,896, Response filed Nov. 18, 2011 to Non Final Office Action mailed Sep. 7, 2011, 14 pgs.

U.S. Appl. No. 12/184,911, Final Office Action mailed Dec. 22, 2011, 16 pgs.

U.S. Appl. No. 12/184,911, Non Final Office Action mailed Jul. 13, 2011, 15 pgs.

U.S. Appl. No. 12/184,911, Notice of Allowance mailed Feb. 27, 2014, 12 pgs.

U.S. Appl. No. 12/184,911, Response filed Feb. 21, 2012 to Final Office Action mailed Dec. 22, 2011, 11 pgs.

U.S. Appl. No. 12/184,911, Response filed Oct. 12, 2011 to Non Final Office Action mailed Jul. 13, 2011, 13 pgs.

* cited by examiner

ANNOTATION DATA FILTERING OF COMPUTER FILES

RELATED APPLICATIONS

This application is related to and claims priority to U.S. provisional patent application 60/953,937, filed Aug. 3, 2007. This application is further related to:

U.S. patent application Ser. No. 11/648,065, entitled "Computer File System Traversal", filed Dec. 30, 2006;

U.S. patent application Ser. No. 12/184,896, entitled "Computer Computer Archive Traversal", filed Aug. 1, 2008, claiming priority to U.S. provisional application 60/953,932, filed Aug. 3, 2007;

U.S. patent application Ser. No. 12/184,904, entitled "Computer File Processing", filed Aug. 1, 2008, claiming priority to U.S. provisional application 60/953,933, filed Aug. 3, 2007;

U.S. patent application Ser. No. 12/184.911, entitled "Annotation Processing of Computer Files", filed Aug. 1, 2008, claiming priority to U.S. provisional application 60/953,935, filed Aug. 3, 2007;

U.S. patent application Ser. No. 12/184,924, entitled "Annotation Data Handlers for Data Stream Processing", filed Aug. 1, 2008, claiming priority to U.S. provisional application 60/953,938, filed Aug. 3, 2007;

U.S. patent application Ser. No. 12/184,932, entitled "Dependency Processing of Computer Files", filed Aug. 1, 2008, claiming priority to U.S. provisional application 60/953,963, filed Aug. 3, 2007; and U.S. patent application Ser. No. 12/184,938, entitled "Data Listeners for Type Dependency Processing", filed Aug. 1, 2008, claiming priority to U.S. provisional application 60/953,964, filed Aug. 3, 2007.

TECHNICAL FIELD

Embodiments of the invention generally relate to the field of computer systems and, more particularly, to a method and apparatus for annotation data filtering of computer files.

BACKGROUND

Computer files, such as Java class files, may have specific standard formats. The standard formats of computer may limit the data that can be provided in relation to the files. For this reason, annotations may be provided to add additional information regarding computer files. Annotations may potentially be found anywhere within a set of computer files.

In a particular example, Java allows annotations to Java class files, with the practice now being specifically described in annotations under Java release 5.0 (Java under the JDK (Java Development Kit) 5.0) as provided in JSR-175 recommendation regarding code annotations. The annotations may add guidance regarding certain class files. Thus, a Java class file may include one or more annotations associated with program elements.

It may become necessary or useful to filter program files in order to obtain annotation values and annotated program elements that may be present in the files. However, the filtering of the program files may require a significant amount of processing time because the annotations may be scattered throughout the computer files in an unpredictable manner. Further, the filtering process may be not easily adaptable to dynamic changes in filtering requirements that may occur as annotations are examined in the process.

SUMMARY OF THE INVENTION

A method and apparatus are provided for annotation data filtering of computer files.

In a first aspect of the invention, an embodiment of a method for annotation filtering of computer files includes receiving a serial data stream input, where the serial data stream input representing one or more computer files. A data type description of a computer file is detected in the data stream, and an announcement of an annotation is detected in the computer file. A determination is made whether to continue processing of the annotation.

In a second aspect of the invention, an embodiment of an annotation filtering system includes a data scanning module, where the data scanning module is to receive a serial data stream input containing one or more computer files and to filter out annotations of interest in the one or more computer files. The data scanning module is to detect a data type description of a computer file in the data stream, detect an announcement of an annotation in the computer file, and determine whether to continue processing of the annotation. The system further includes a data handling module, where the data listening module is to receive detected annotation data from the data scanning module and to generate a data stream output containing the detected annotation data.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
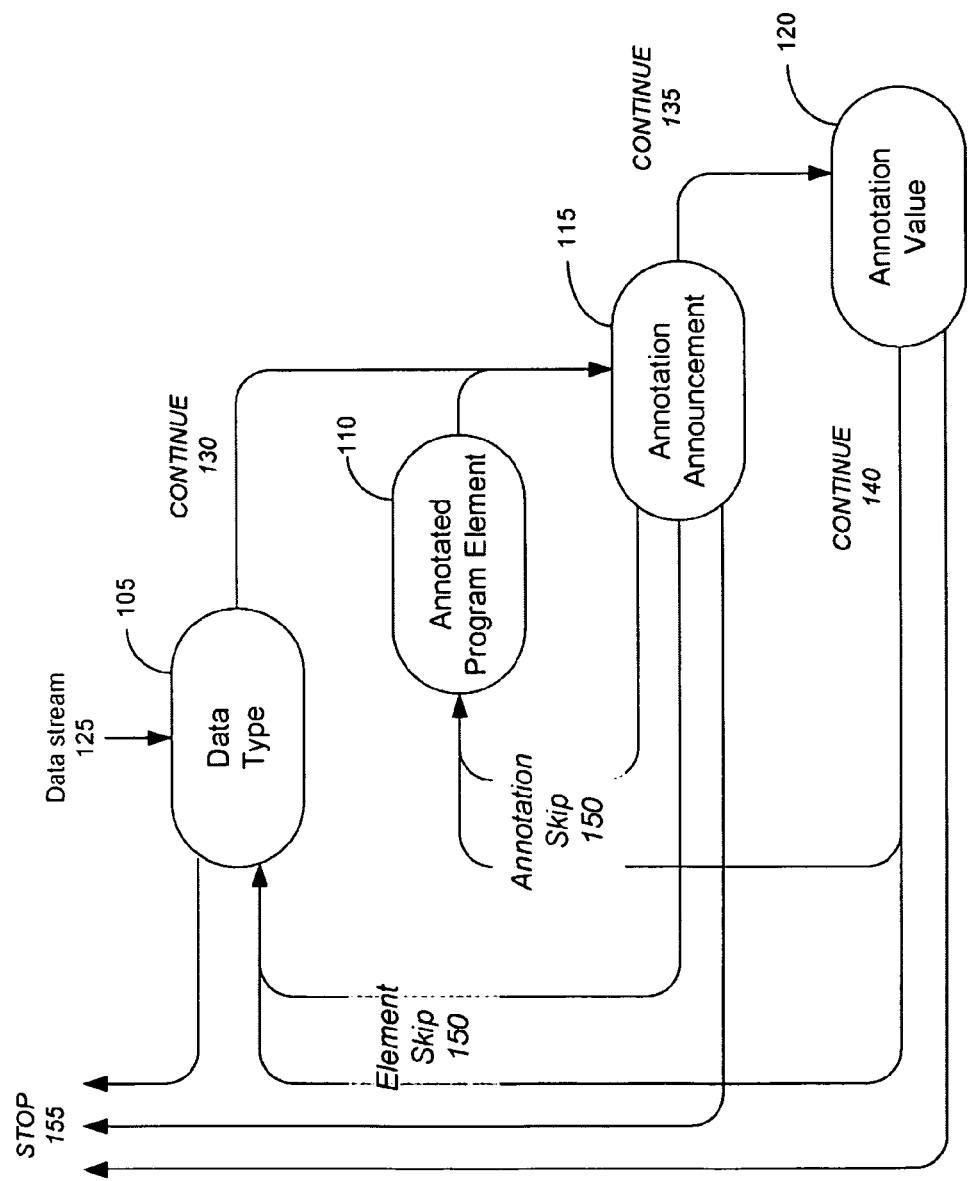
FIG. 1 is an illustration of annotation filtering of computer files.

Embodiments of the invention are generally directed to type dependency processing of computer files.

As used herein:

"Annotation" means additional information or metadata that is associated with or attached to a particular point in a computer program. The term annotation includes formal and informal annotation methods, including, but not limited to, annotations under Java release 5.0 (Java under the JDK (Java Development Kit) 5.0) as provided in JSR (Java Specification Request) 175 recommendation regarding code annotations ("A Metadata Facility for the Java Programming Language").

"Data type" means a classification of a computer file. Data type includes, but is not limited to, a type of a Java class file.

"Computer file" means any file structure used in a computer system. Computer files include files with specific required structures, including Java class files.

"Class file" means a Java class file. A Java class file is a defined format for compiled Java code, which may then be loaded and executed by any Java virtual machine. The format and structure for a Java class file is provided in JSR 000202, Java Class File Specification Update (Oct. 2, 2006) and subsequent specifications.

"Traversal" means a process for progressing through the elements of a computer system, including a process for progressing through the elements of a computer archive.

"Archive" means a single file that may contain one or more separate files. An archive may also be empty. The files within an archive are extracted, or separated, from the archive for used by a computer program. The files contained within an archive are commonly compressed, and the compressed files are decompressed prior to use. An archive may further include data required to extract the files from the archives "Archive" may also refer to act of transferring one or more files into an archive.

In an embodiment of the invention, computer files are filtered to obtain needed annotations found within the computer file. In an embodiment, the computer files are in the form of a serial data stream, with the data stream being filtered to separate annotations that are of interest in the computer files. In one embodiment, a set of computer files includes a set of Java class files. In an embodiment of the invention, computer files are extracted into a neutral format to allow efficient filtering of annotations.

In an embodiment of the invention, a dynamic annotation filtering process includes receiving a serial data stream input, where the serial data stream input is representing one or more computer files. In particular, the computer files may be Java class files that have been converted into a serial data stream. In an embodiment, the serial data stream may include a data type description prior to any annotations relating to the data type, and may include an annotation announcement prior to an annotation value. In this process, a data type description for a computer file may be detected in the data stream, and an announcement of an annotation is detected in the computer file. A determination is then made whether to continue processing of the annotation. In an embodiment, the annotation is skipped if the annotation is not of interest, with the process then continuing with detecting additional annotations in the computer file, if any. In an embodiment, the program elements in a computer file are skipped if the program elements are not of interest, with the process then continuing with detecting data type descriptions of additional computer files in the data stream, if any.

If the processing of an annotation is continued, then the processing of the annotation includes obtaining an annotation value in the computer file, and determining whether to continue processing of the annotation value. If processing of the annotation value is continued, then an annotated program element of the computer file associated with the annotation value is obtained, and an output is generated that includes the annotated program element and the annotation value.

In an embodiment of the invention, a processing system includes a scanning module to scan the data stream input and output a data stream that includes selected annotated elements and annotation values. In an embodiment, the processing system further includes a handler module to handle the data stream output. In an embodiment, the handler module further provides feedback to the scanning module to direct the selection of annotations by the scanning module. In an embodiment, the file processor may include additional handlers to provide other functions. In one embodiment of the invention, a dedicated, independent processing module is provided for annotation processing, but embodiments of the invention are not limited to a dedicated module implementation.

In an embodiment of the invention, a scanner operates by sending data to the handler as it is identified in the data stream. In an embodiment, a type definition is thus received before receiving any of the program elements within the type, and thus also prior to any annotation value for the program elements within the type. In this manner, the handler may receive a type definition and may provide a callback to the scanner if the handler is not interested in annotations for type definition. If the handler indicates that it is not interested in any annotations for the type definition, the scanner may then skip any annotation values for the type definition.

In an embodiment of the invention, a set of computer files are scanned in a single pass as a serial data stream without requiring multiple readings of the file data. In an embodiment, the same serial data stream format is maintained both on input and output, thereby allowing further processing of computer files without further file conversion.

In an embodiment, the conversion of the data into a data stream allows processing without any dependency on random access files, and broadens the applicable scope of the process for the input. In an embodiment, the processing of class files as a data stream allows processing without requiring use of, for example, Java library utilities that may normally be required to conduct the file processing.

In an embodiment of the invention, the conversion of computer files to a data stream allows for the use of a protocol for both the data producer (the computer file processor) and the data consumer without creating a complete file representation, thereby simplifying the data structure. In an implementation for Java class files, the processing system operates with a class file data model, without requiring the addition of any major abstraction for data processing.

In an embodiment, the conversion of computer files to a serial data format may include, but is not limited to, the operation of a traversal of a hierarchical data structure or of a data archive as provided respectively in patent application Ser. No. 11/648,065, entitled "Computer File System Traversal", filed Dec. 30, 2006. Other processes for conversion of a set of files to a serial data stream may also be utilized in embodiments of the invention.

In an embodiment of the invention, processing is designed to provide sufficient performance for overall computer file processing. For example, in an embodiment a system includes stream buffering to buffer data as it is obtained and processed. In addition, an embodiment of the invention provides a compact internal file state in the data stream, thereby minimizing the amount of data that will be required in the process of transferring and processing the computer files.

In an embodiment of the invention, a data scanner may be provided in multiple implementations, depending on the system requirements. A data scanner may be a portion of a file processor. In one example, native processing implementations may be provided for a computer file scanner, with the native implementations being based upon relevant Java standards. In another example, a non-native implementation may be provided, as required. A particular non-native implementation may include a BCEL (Byte Code Engineering Library) implementation, with the BCEL API being a toolkit for the static analysis and dynamic creation or transformation of Java class files.

In an embodiment of the invention, a data consumer that receives output data is a main framework extension point for which neutral utility implementations might be required. In an embodiment of the invention, a file processor (the data producer) operates using the same data protocol as the data consumer protocol. In an embodiment of the invention, the data consumer may have control over the data to be provided to the data consumer. In an embodiment, the data producer and the data consumer may cooperate to agree on the data to be provided from the serial data stream. In an embodiment of the invention, a system may include complexity control, including configuring the file processor to deliver the data of interest. In an embodiment, the data of interest includes data meeting a certain degree of detail, or certain types of data. In an embodiment of the invention, the structure of the data processing may allow for a system to be utilized with loose semantics and implementation constraints. For example, the technical framework and protocol data types may be defined. However, there may be leeway for implementation characteristics, such as the result order sequence and analysis capabilities.

In an embodiment of the invention, file processing may be included within a set of tools that are provided to search files. The tools may, for example, provide for the conversion of files into serial form by a traversal process, the scanning of data for desired elements, and other related processes.

FIG. 1 is an illustration of annotation filtering of computer files. In this illustration, a data stream 125 is received, the data stream representing a serial version of a set of computer files. In particular, the computer files may be Java class files, which have been converted into a serial data stream. In a particular embodiment, the Java class files are arranged in a serial format such that type definition is encountered prior to any program elements in a class file, and such that an annotation announcement is made prior to reading any annotation value. In this process, a data type, such as a type definition for a Java class file is encountered 105. The process continues 130 by determining if an annotation is present 115. If not, then the process may continue to the next data type definition, such as the next class file.

If an annotation is encountered, it is announced 115, and the process may continue 135 with obtaining the annotation value 120 and the annotated program element 110. Upon encountering the annotation, the process may alternatively skip the annotation 150 if the annotation is not of interest, with the process remaining with the program element 110 to determine whether another annotation is encountered and announced 115, or skip the program elements if the elements in the data type are not of interest, with the process continuing to determine whether another data type 105 is encountered. Upon encountering the annotation value 120, the process may alternatively skip the annotation 150 if the annotation is not of interest or skip the program elements if the elements in the data type are not of interest. The process may stop 155 if there are no more data elements encountered in the data stream 125 or if another condition occurs that requires the stopping of the filtering process.

Figure 2:
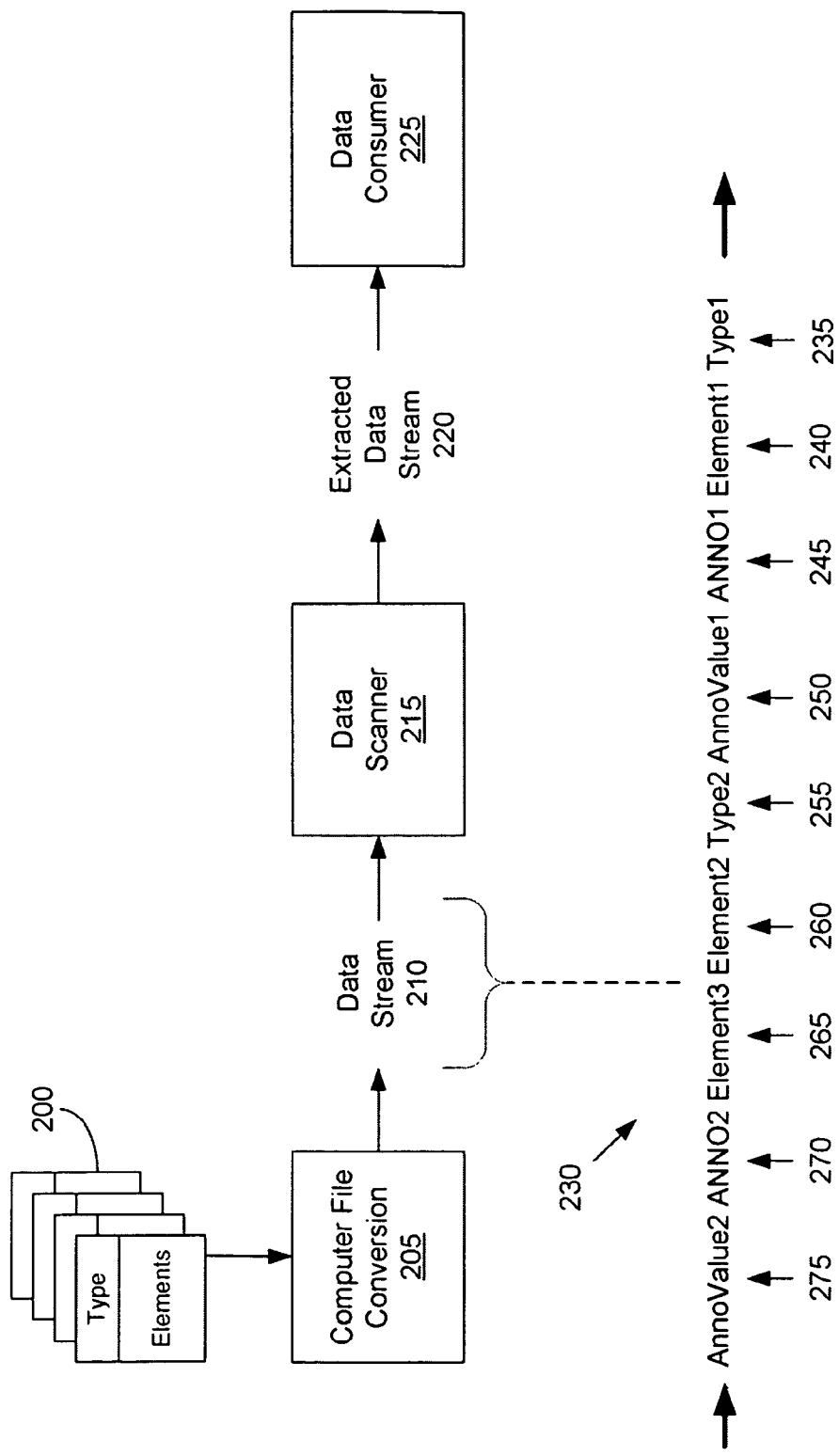
FIG. 2 is an illustration of an embodiment of processing of computer file data.

FIG. 2 is an illustration of an embodiment of processing of computer file data. In this illustration, a computer file conversion module 205 is provided to convert computer file data 200 into a serial data stream 210. The computer file data 200 may be, but is not limited to, Java class file program elements. The conversion of the computer file data may include, but is not limited to, the traversal of a hierarchical file or archive. The output of the processing of computer file data is a serial data stream 210 representing the computer file data.

In an embodiment, the serial data stream includes one or more annotations. For example, the data stream 210 is illustrated as a series of data elements arriving as a data stream 230. In this data stream, there is a type definition prior to any program elements within the type, and an annotation announcement is made prior to any annotations. For example, Type1 235 is a first type definition, which is followed by program element Element1 240 within Type1. Element1 240 is associated with an annotation, with ANNO1 245 being a first annotation descriptor for annotation value AnnoValue1 250. The data stream further includes a second type definition Type2 255, which includes program elements Element2 260 and Element3 265. Element3 265 is associated with a second annotation, as shown by second annotation descriptor ANNO2 270 and annotation value AnnoValue2 275.

In an embodiment of the invention, the serial data stream 210 then is provided to a data scanner 215, which processes the data, including scanning the data stream for data elements of interest, including annotations to the data elements within the data stream. The scanner 215 may contain multiple modules or sub-modules, depending on the particular embodiment. The scanner 215 outputs an extracted data stream 220, which represents elements of the data stream that have been selected by the scanner 215. In this implementation, the extracted data stream would contain the annotated data elements and associated annotation values. The extracted data stream 220 then is eventually provided to a data consumer 225. The consumer 225 may receive additional reports or data processing as required for the needs of the consumer 225.

Figure 3:
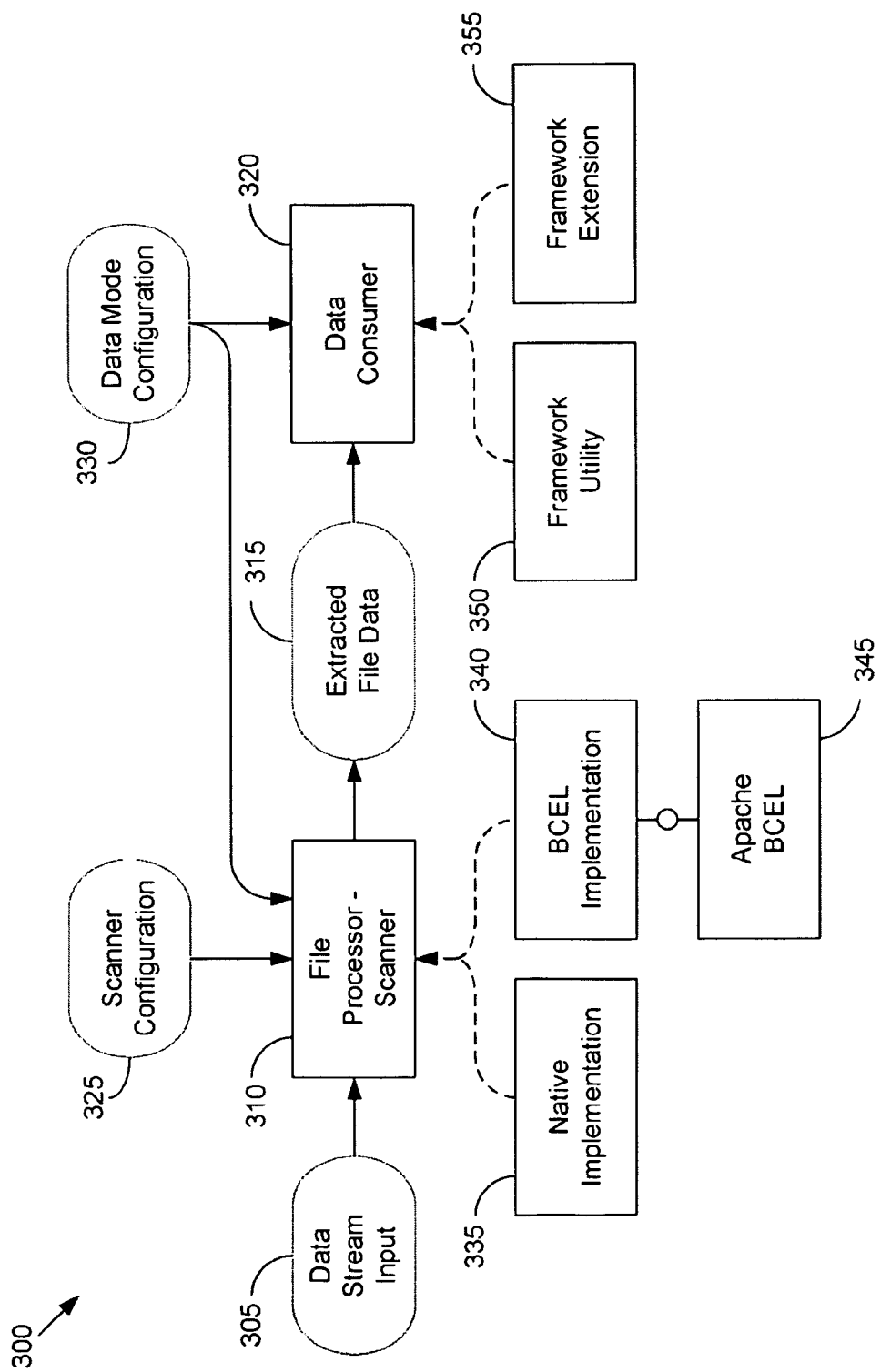
FIG. 3 is an illustration of a computer file processing system.

FIG. 3 is an illustration of a computer file processing system 300. While this illustration shows the processes occurring within a single system for simplicity in description, the processes may occur in multiple systems, including multiple systems within a network. In this illustration, a computer file data stream input 305 is provided to a file processor 310, which may include a scanner to scan the data for desired program elements. The data stream 305 may, for example, represent Java class file data that has been converted into a serial data stream. The file processor 310 may include multiple components, depending on the particular embodiment of the invention. The file processor 310 generates an extracted computer file data stream 315, which may be presented to a data consumer 320.

In an embodiment of the invention, the operation of the computer file processing system 300 is directed by certain inputs and settings. The operation of the file processor 310 may be directed by a scanner configuration 325. In addition, a data mode configuration 330 affects both the file processor 310 and the data consumer 320. The file processor 310 also may include one of multiple implementations. In particular embodiments, the implementation may be a native implementation 335 or a BCEL (Byte Code Engineering Library) implementation 340. The BCEL implementation 340 may include the Apache BCEL process 345, as developed by the Apache Software Foundation. In addition, the consumer 320 may utilize a framework utility 350 and a framework extension 355 in the operation of the computer file processing.

Figure 4:
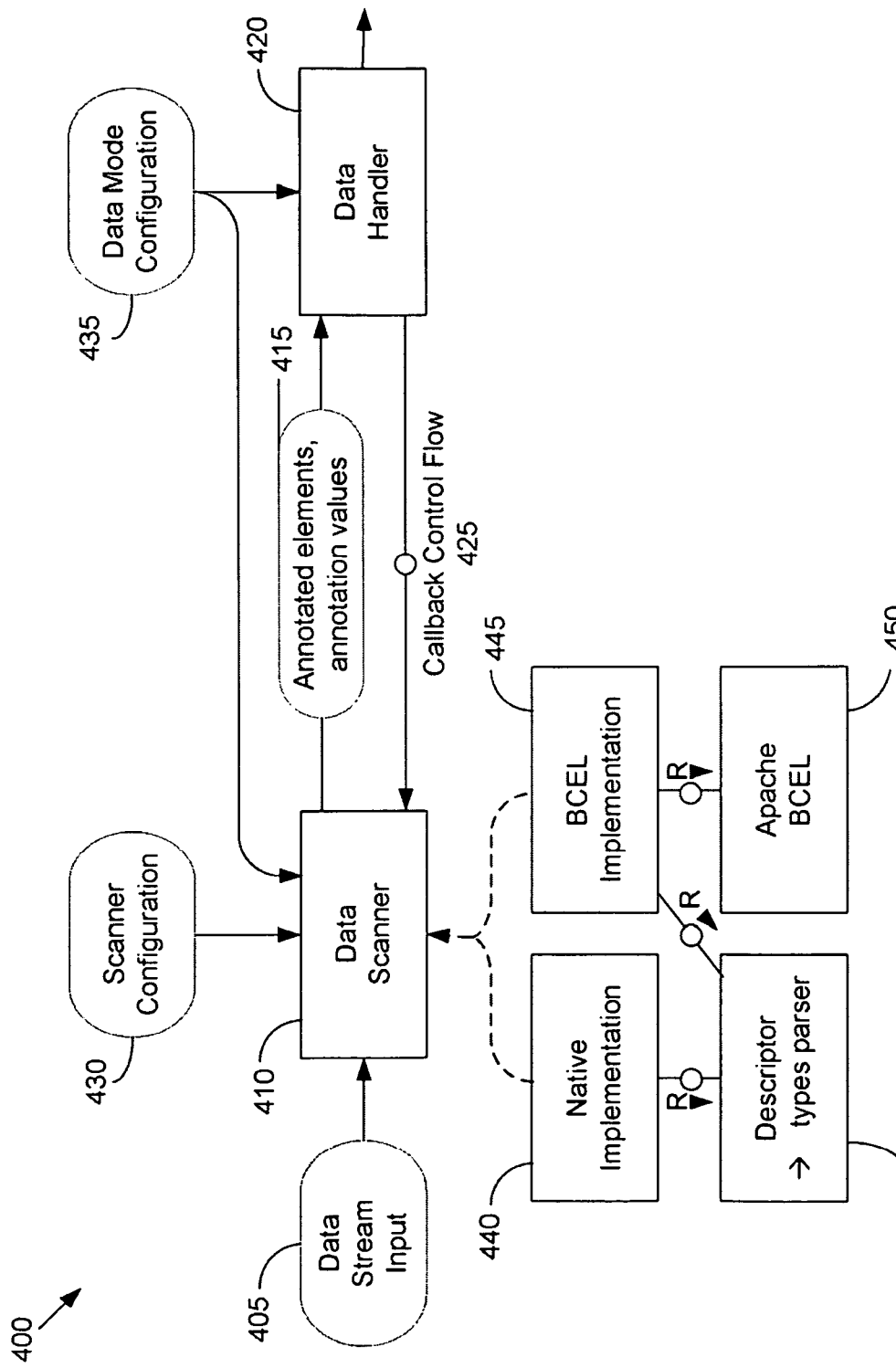
FIG. 4 is an illustration of an embodiment of a system to process annotated program elements.

FIG. 4 is an illustration of an embodiment of a system to process annotated data elements. The system 400 may include a data scanner 410 and a data handler 420. The data scanner 410 may, for example, represent the file processor 310 illustrated in FIG. 3 or a subpart of the file processor 310. The data handler may represent the data consumer 320 illustrated in FIG. 3 or a subpart of the data consumer 310. In this illustration, the data scanner 410 is to scan a received data stream input 405 for annotations, and to produce a data stream containing selected annotated data elements and annotation values. The data handler 420 is to receive and handle the output of the scanner 410. The operation of the data handler includes the provision of feedback to the data scanner 415. As illustrated, in addition to any other functions, the data handler 420 provides a callback control flow 425 to inform the scanner whether particular data elements are desired. For example, the data scanner 410 may encounter a particular data type, and the data handler 420 may inform the data scanner 410 via the callback control flow 425 that annotations for the particular class type are not of interest. Upon being informed via the callback control flow 425 that annotations for the particular class type are not of interest, the data scanner 410 may then skip the elements in class type.

The data scanner 410 may include a native implementation 440 and a BCEL implementation 445, illustrated with Apache BCEL 450. The implementations may be associated with a parsing module to recognize type descriptors and identify the appropriate types. Also illustrated are the scanner configuration 430 and the data mode configuration 435.

Figure 5:
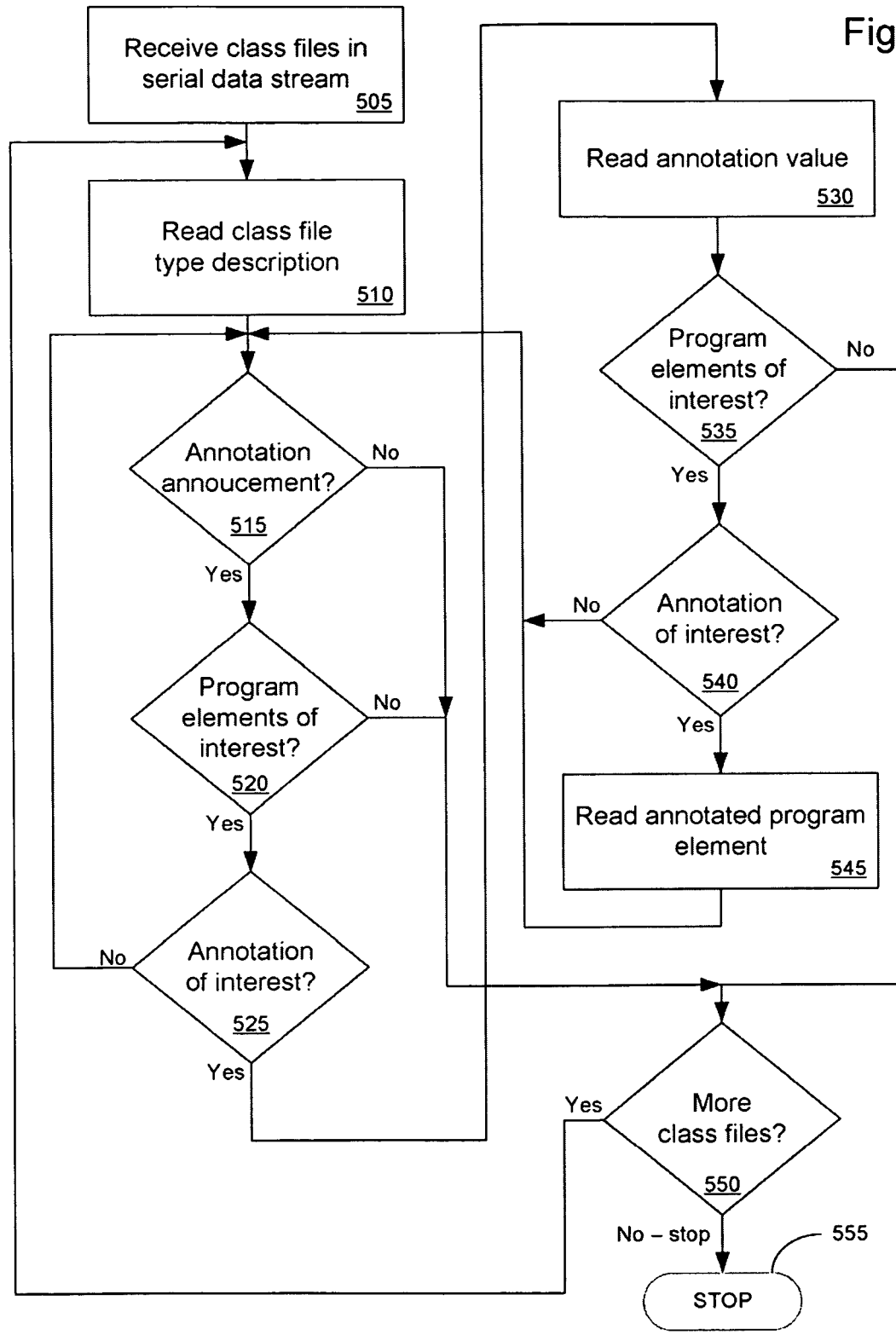
FIG. 5 is a flowchart to illustrate an embodiment of an annotation data filtering process.

FIG. 5 is a flowchart to illustrate an embodiment of an annotation data filtering process. In an embodiment of the invention, a set of class files are received as a serial data stream 505. The class file type description is read 510 and there is a determination whether an annotation announcement is encountered in the class file 515. If not, then there are no annotations in the class file, and there is a determination whether there are more class files 550. If there are more class files, the process continues with reading the type description of the next class file 510, and if not then the process stops 555.

If an annotation is announced 515, then there is determination whether the program elements are of interest. If not, then the process continues with a determination whether there are more class files to be encountered in the data stream 550. If the program elements are of interest, then there is a determination whether the annotation is of interest 525. If not, then the process continues with a determination whether there are more class files to be encountered in the data stream 550. If the annotation is of interest, the annotation value is read 530, and there is a determination whether there are program elements of interest 535. If not, then the process continues with a determination whether there are more class files to be encountered in the data stream 550. If there are program elements of interest, then there is a determination whether the annotation is of interest 540. If not, then there is a return to determining whether is an annotation announcement 515. If the annotation is of interest, then the annotated program element is read 545, and there is a return to determining whether is an annotation announcement 515.

Figure 6:
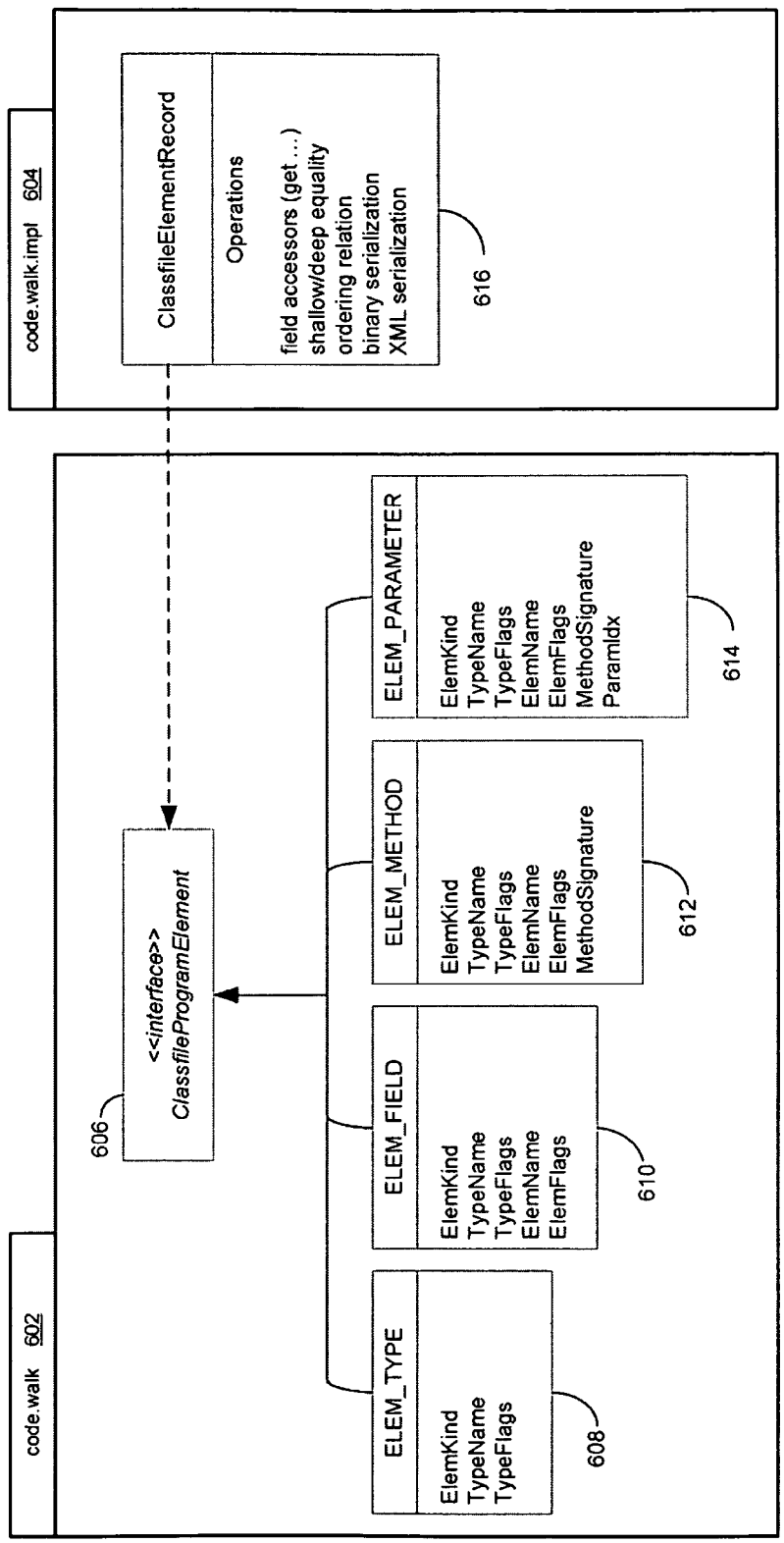
FIG. 6 is an illustration of an embodiment of a class file program element as a data stream.

FIG. 6 is an illustration of an embodiment of a class file program element as a data stream. In this illustration, a class file program element 606 is shown within a code walk module 602 (used in the traversal of class files). The class file program element 606 is represented by an element type 608 (including an element kind, type name, and type flags), an element field 610 (also including an element name and element flags), and one or more element methods 612 (also including a method signature), and an element parameter 614 (paramldx). The element further includes a class file element record 616 in the code walk implementation 604, including one or more operations (defining field accessors, shallow or deep equality, ordering relation, binary serialization, and XML serialization).

Figure 7:
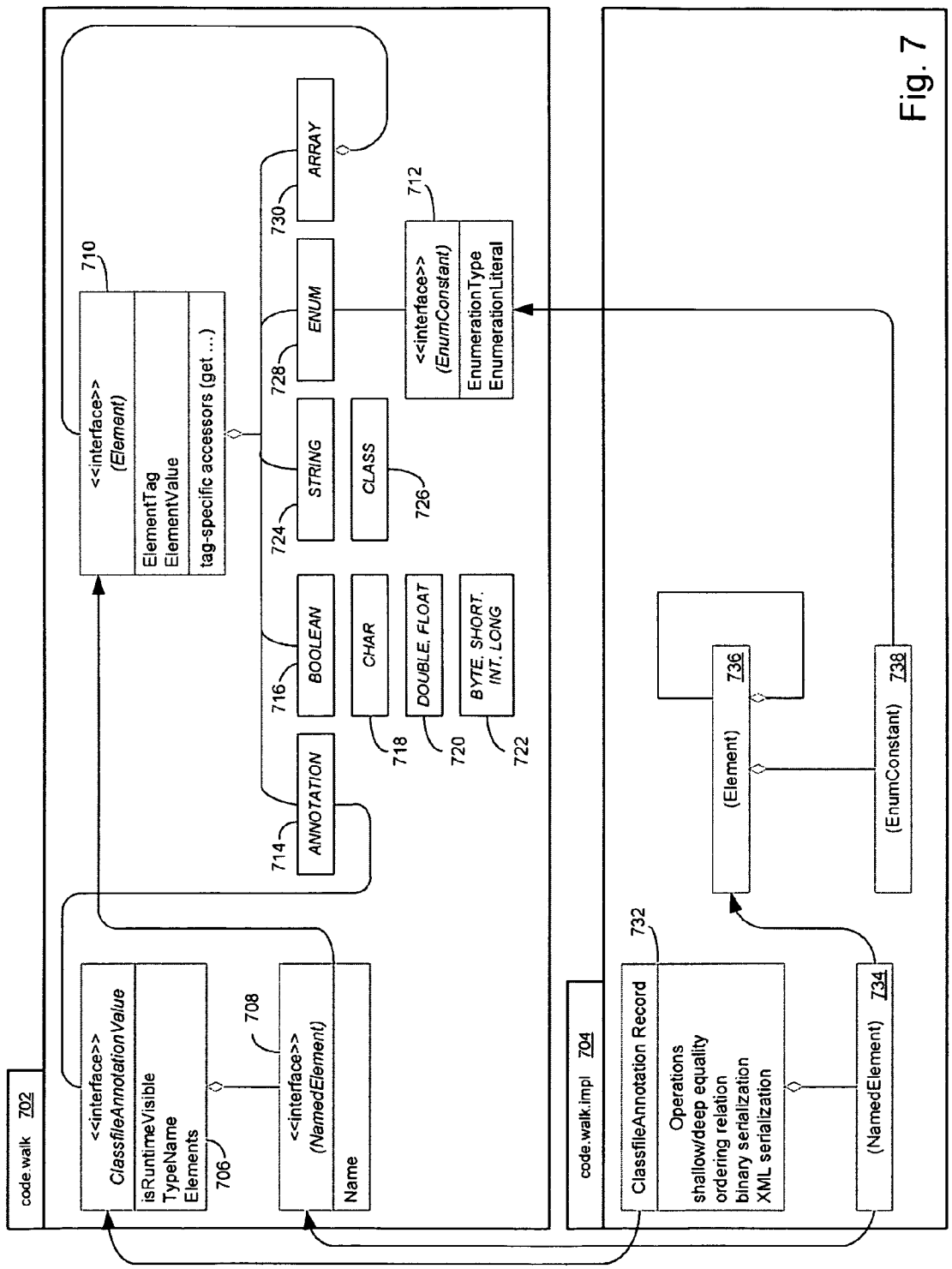
FIG. 7 is an illustration of an embodiment of an annotation to a class file program element presented as a data stream

FIG. 7 is an illustration of an embodiment of an annotation to a class file program element presented as a data stream. In this illustration, an annotation is represented in the code walk 702 as a class file annotation value 706, including whether the value is visible at runtime, a type name, and the annotation elements. The class file annotation value 706 is related to a particular named program element 708, which includes the element name. The annotated program element 710 includes the element tag and element value, as well as tag-specific accessors. The program element 710 is shown in relation to the annotation 714, as well as either Boolean 716, char (character) 718, double, float 720, byte, short, int (integer), or long 722. The program element further may include a string 724 or class 726, an enum (enumeration constant) 728, and an array 730. The enumeration constant 728 is illustrated 712 as including an enumeration type and enumeration literal.

The annotation is further illustrated as a class file annotation record 732 in a code walk implementation 704. The class file annotation record 732 includes operations, including shallow or deep equality, the ordering relation, binary serialization, and XML serialization 732. The class file annotation record 732 is shown in relation with the named element 734. Also illustrated are the annotated element 736 and the enumeration constant 738.

Figure 8:
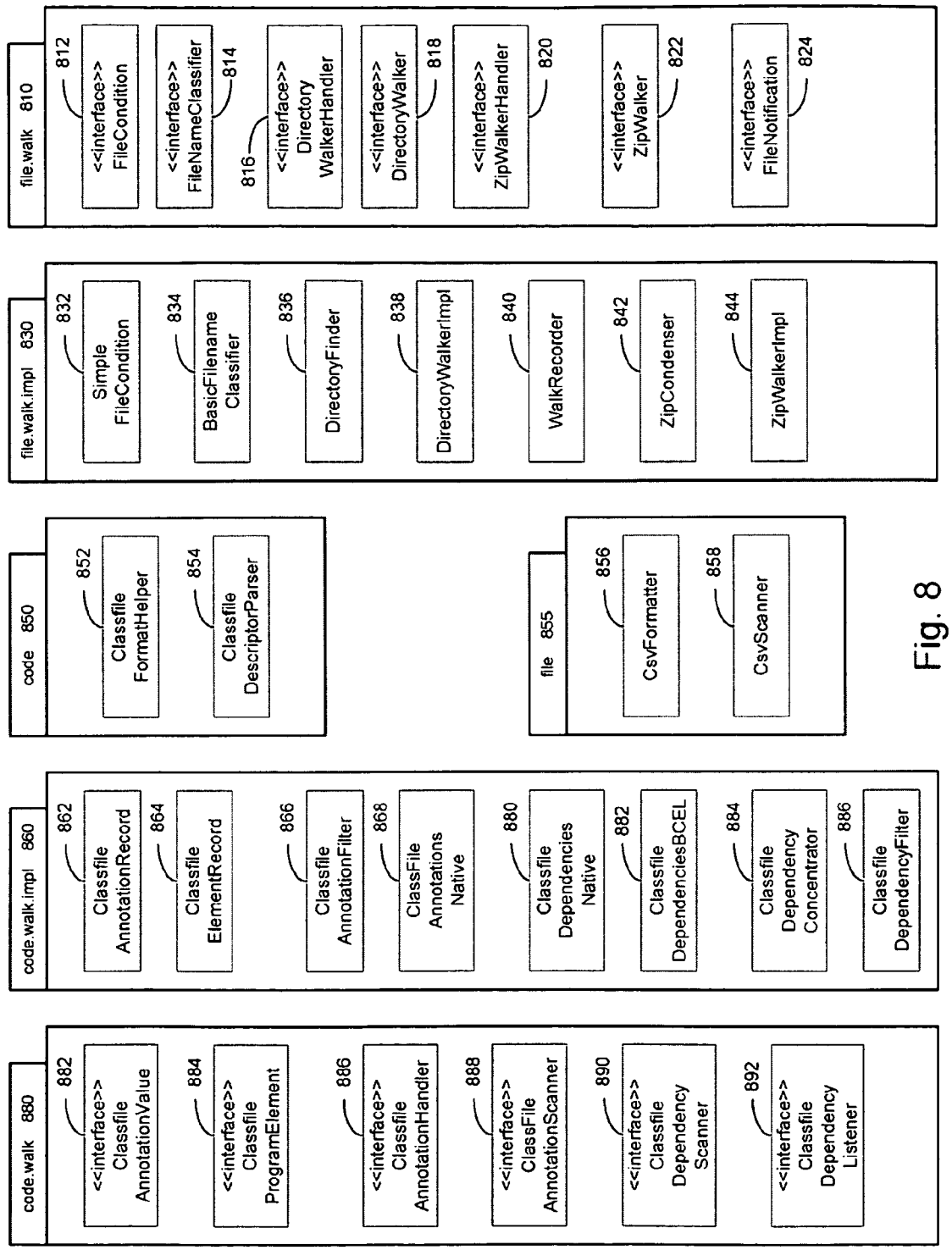
FIG. 8 illustrates an embodiment of library utilities.

FIG. 8 illustrates an embodiment of library utilities. FIG. 8 may illustrate software modules, hardware modules, or modules including a combination of software and hardware. In this illustration, the utilities relate to an interface layer comprising code walk interfaces (code.walk 880); for class file processing and file walk interfaces (file.walk 810) for locating files; and further to an implementation toolbox comprising code processing 850 and a code walk implementation (code.walk.impl 860) for class file processing, and file processing 855 and a file walk implementation (file.walk.impl 830) for locating files.

In the interface layer, the code walk interfaces 880 may include a class file annotation value interface module 882, a class file program element interface module 884, a class file annotation handler interface module 886, a class file annotation scanner interface module 888, a class file dependency scanner interface module 890, and a class file dependency listener interface module 892. The file walk interfaces then may include a file condition interface module 812, a file name classifier interface module 814, a directory walker handler interface module 816, a directory walker interface module 818, a zip walker handler interface module ("zip" indicating use for archives) 820, a zip walker interface module 822, and a file notification interface module 824.

In an embodiment of the invention, the code processing 850 may provide for parsing types from class file descriptors. Code processing 850 may include a class file format helper module 852 and a class file descriptor parser module. The code walk implementation 860 for class file processing may include a class file annotation record module 862, a class file element record module 864, a class file annotation filter 866, a class file annotation for native elements 868, a class file dependencies module for native elements 870, a class file dependencies module for BCEL (Byte Code Engineering Library) elements 872, a class file dependency concentrator module 874, and a class file dependency filter 876.

In an embodiment of the invention, the file processing 855 may include a comma separated value (CSV) formatter and a CSV scanner. The file walk implementation 830 for locating files may include a simple file condition module 832, a basic file name classifier module 834, a directory finder module 836, a directory walker implementation module 838, a walk recorder module 840, a zip (archive) condenser module 842, and a zip walker implementation module 844.

Figure 9:
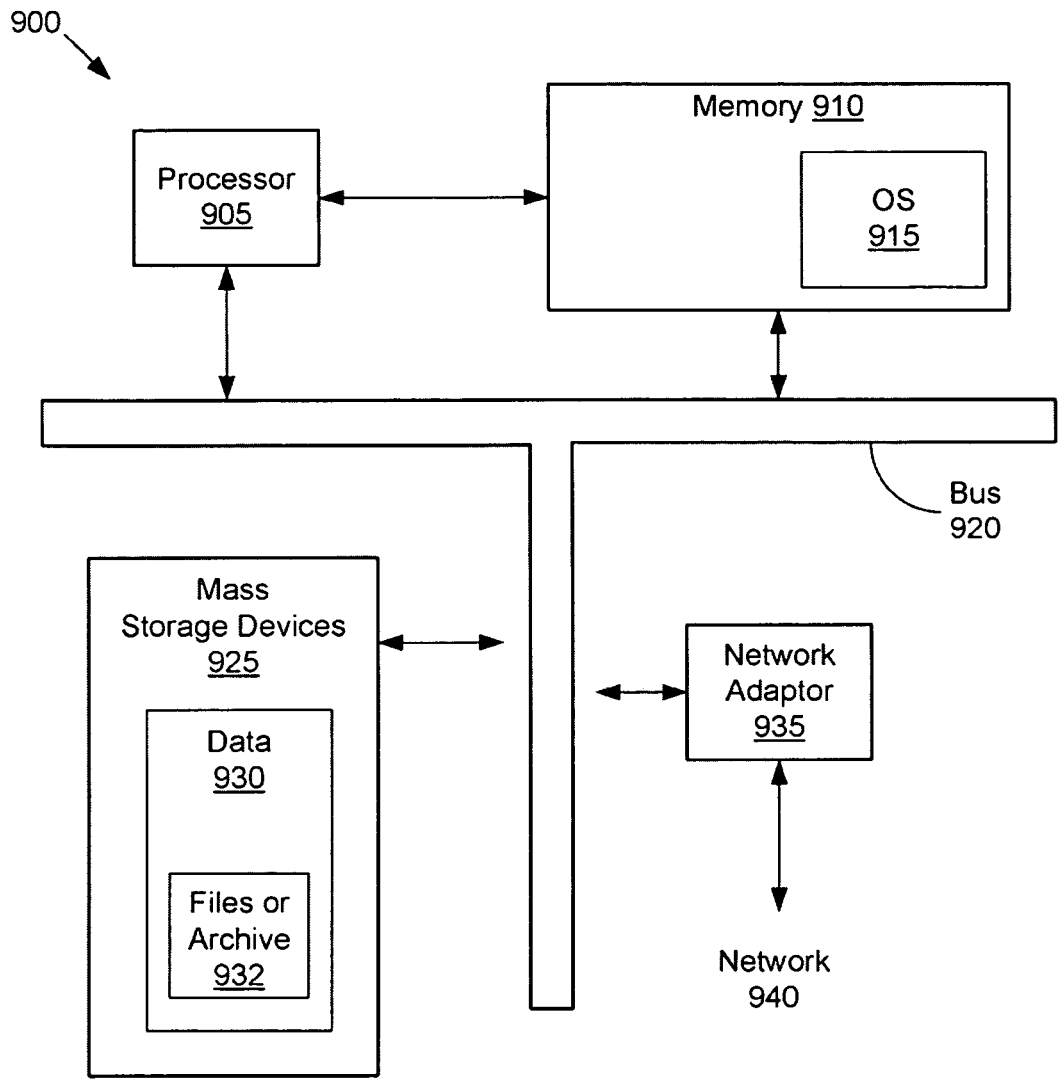
FIG. 9 is an illustration of a computer system in an embodiment of the invention.

FIG. 9 is an illustration of a computer system in an embodiment of the invention. The computer system may be utilized as a system for processing of computer files in the form of a data stream, or may represent one of multiple systems used in such processing. The computing system illustrated in FIG. 9 is only one of various possible computing system architectures, and is a simplified illustration that does include many well-known elements. As illustrated, a computing system 900 can execute program code stored by an article of manufacture. Computer system 900 may be a J2EE system, ABAP (Advanced Business Application Program) system of SAP AG, or administration system. A computer system 900 includes one or more processors 905 and memory 910 coupled to a bus system 920. The bus system 920 is an abstraction that represents any one or more separate physical buses, point-to-point connections, or both connected by appropriate bridges, adapters, or controllers. The bus system 920 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 9, the processors 905 are central processing units (CPUs) of the computer system 900 and control the overall operation of the computer system 900. The processors 905 execute software stored in memory 910. A processor 905 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 910 is or includes the main memory of the computer system 900. Memory 910 represents any form of random access memory (RAM), read-only memory (ROM), flash memory, or the like, or a combination of such devices. Memory 910 stores, among other things, the operating system 915 of the computer system 900.

Also connected to the processors 905 through the bus system 920 are one or more mass storage devices 925 and a network adapter 935. Mass storage devices 925 may be or may include any conventional medium for storing large volumes of instructions and data 930 in a non-volatile manner, such as one or more magnetic or optical based disks. In an embodiment of the invention, the mass storage devices may include storage of file or an archive 932 that requires processing. In an embodiment of the invention, the processors 905 may operate to traverse the files or archive 932, the traversal of the files or archive 932 resulting in output of a serial data stream representing selected elements of the archive. The processor 905 may scan the serial stream for desired program elements within the computer files. In another embodiment the computer system 900 may provide for the conversion of the computer files into a serial data stream, while another system or systems is responsible for scanning the data stream for desired program elements.

The network adapter 935 provides the computer system 900 with the ability to communicate with remote devices, over a network 940 and may be, for example, an Ethernet adapter. In one embodiment, the network adapter may be utilized to output data including, for example, an extracted serial data stream representing selected elements of the files or archive 932.

Figure 10:
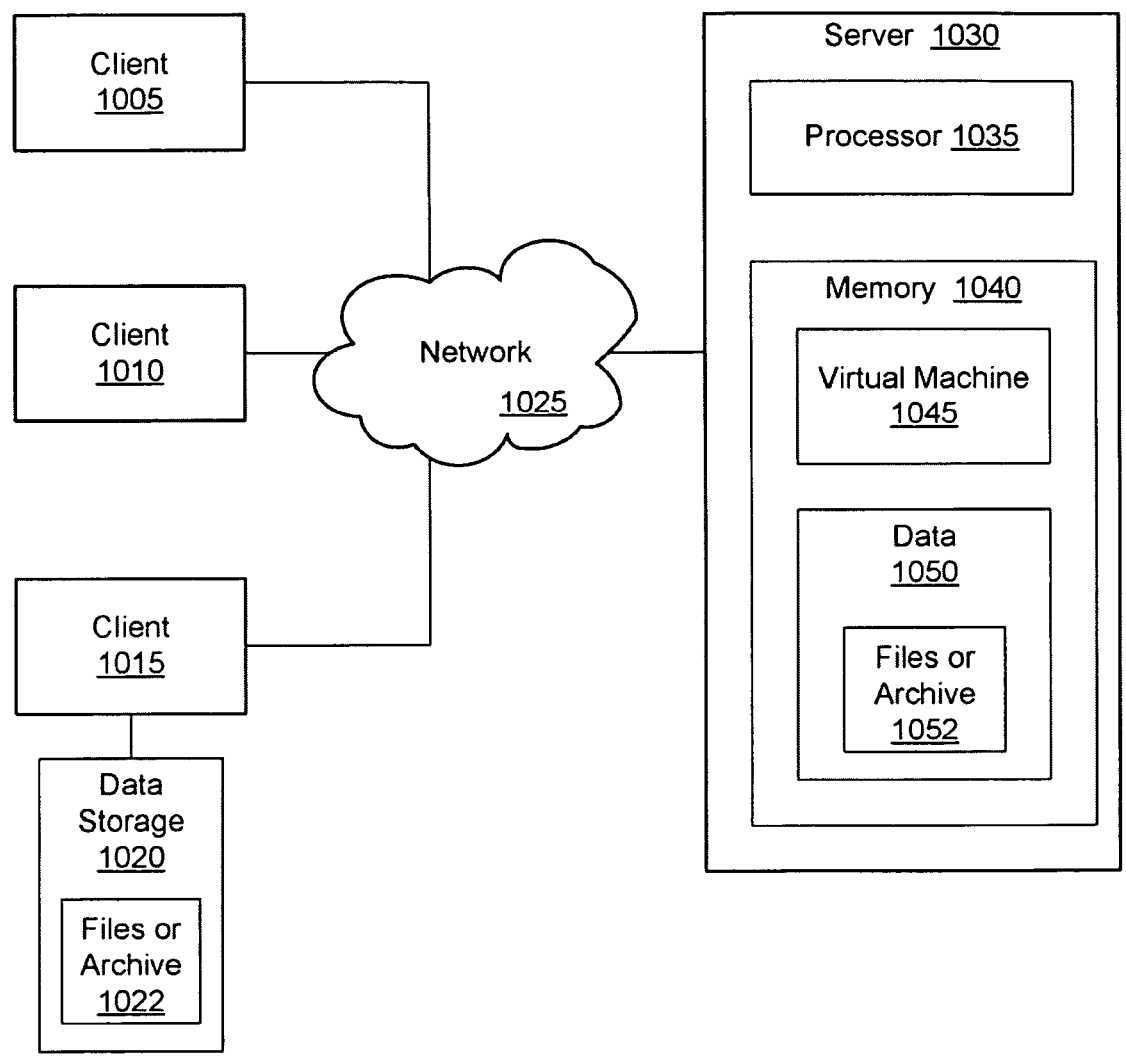
FIG. 10 illustrates an embodiment of a client-server network system.

FIG. 10 illustrates an embodiment of a client-server network system. As illustrated, a network 1025 links a server 1030 with client systems 1005, 1010, and 1015. Client 1015 may include certain data storage 1020, including computer files in the form of, for example, a computer file hierarchy or computer archive 1022. Server 1030 includes programming data processing system suitable for implementing apparatus, programs, and/or methods in accordance with one or more embodiments of the present invention. Server 1030 includes processor 1035 and memory 1040. Server 1030 provides a core operating environment for one or more runtime systems, including, for example, virtual machine 1045, at memory 1040 to process user requests. Memory 1040 may include a shared memory area that is accessible by multiple operating system processes executing in server 1030. For example, virtual machine 1045 may include an enterprise server (e.g., a J2EE-compatible server or node, Web Application Server developed by SAP AG, WebSphere Application Server developed by IBM Corp. of Armonk, N.Y., and the like). Memory 1040 can be used to store an operating system, a Transmission Control Protocol/Internet Protocol (TCP/IP) stack for communicating over network 1025, and machine executable instructions executed by processor 1035. The memory 1045 may also include data 1050 for processing, including the processing of data that includes data of one or more computer file hierarchies or computer archives 1052. In an embodiment, the data has been converted into a serial data stream for processing. In some embodiments, server 1035 may include multiple processors, each of which can be used to execute machine executable instructions.

Client systems 1005-1015 may execute multiple application or application interfaces. Each instance or application or application interface may constitute a user session. Each user session may generate one or more requests to be processed by server 1030. The requests may include instructions or code to be executed on a runtime system, such as virtual machine 1045 on server 1030.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method for annotation filtering of computer files, the method comprising:
   receiving a serial data stream input, the serial data stream input representing, one or more computer files, the serial data stream input comprising data type descriptions of the one or more computer files and program elements corresponding to the data type descriptions;
   detecting a first one of the data type descriptions in the serial data stream input;
   detecting a first annotation for a first one of the program elements corresponding to the first one of the data type descriptions in the serial data stream input based on detecting the first one of the data type descriptions;
   determining if the first annotation and the program elements corresponding to the first one of the data type descriptions are of interest in response to detecting the first annotation;
   obtaining an annotation value for the first annotation in the serial data stream input in response to determining the first annotation and the program elements corresponding to the first one of the data type descriptions are of interest; and
   generating output comprising the annotation value for the first annotation in response to determining the first annotation and the program elements corresponding to the first one of the data type descriptions are of interest.

2. The method of claim 1, further comprising detecting a second annotation for one of the program elements corresponding to the first one of the data type descriptions based on the first annotation not being of interest.

3. The method of claim 1, further comprising detecting a second data type description in the serial data stream input based on the program elements of the first one of the data type descriptions not being of interest.

4. The method of claim 1, further comprising:
   obtaining an annotated program element of the serial data stream input associated with the annotation value; and
   including the annotated program element in the output.

5. The method of claim 1, wherein the one or more computer files comprise Java class files.

6. An annotation filtering system comprising:
   a data scanning module, the data scanning module comprising at least one hardware device and configured to:
      receive a serial data stream input containing one or more computer files, the serial data stream input comprising data type descriptions of the one or more computer files and program elements corresponding to the data type descriptions;
      detect a first one of the data type descriptions in the serial data stream input;
      detect a first annotation for a first one of the program elements corresponding to the first one of the data type descriptions in the serial data stream input based on detecting the first one of the data type descriptions;
      determine if the first annotation and the program elements corresponding to the first one of the data type descriptions are of interest in response to detecting the first annotation;
      obtain an annotation value for the first annotation in the serial data stream input in response to determining the first annotation and the program elements corresponding to the first one of the data type descriptions are of interest; and
      generating output comprising the annotation value for the first annotation in response to determining the first annotation and the program elements corresponding, to the first one of the data type descriptions are of interest; and
   a data handling module, the data handling module to:
      receive the output from the data scanning module; and
      generate a data stream output containing the output.

7. The annotation filtering system of claim 6, the data scanning module to detect a second annotation for one of the program elements corresponding to the first one of the data type descriptions based on the first annotation not being of interest.

8. The annotation filtering system of claim 6, the data scanning module to detect a second data type description in the serial data stream input based on the program elements of the first one of the data type descriptions not being of interest.

9. The annotation filtering system of claim 6, the data scanning module to obtain an annotated program element of the serial data stream input associated with the annotation value, and include the annotated program element in the output.

10. The annotation filtering system claim 6, wherein the one or more computer files comprise Java class files.

11. An article of manufacture comprising:
    a non-transitory computer-readable medium including instructions that, when executed by at least one processor of a machine, cause the machine to perform operations comprising:
    receiving a serial data stream input, the serial data stream input representing one or more computer files, the serial data stream input comprising data type descriptions of the one or more computer files and program elements corresponding to the data type descriptions;
    detecting a first one of the data type descriptions in the serial data stream input;
    detecting a first annotation for a first one of the program elements corresponding to the first one of the data type descriptions in the serial data stream input based on detecting the first one of the data type descriptions;
    determining if the first annotation and the program elements corresponding to the first one of the data type descriptions are of interest in response to detecting the first annotation;
    obtaining an annotation value for the first annotation in the serial data stream input in response to determining the first annotation and the program elements corresponding to the first one of the data type descriptions are of interest; and generating output comprising the annotation value for the first annotation in response to determining the first annotation and the program elements corresponding to the first one of the data type descriptions are of interest.

12. The article of manufacture of claim 11, wherein the medium further includes instructions that, when executed by the at least one processor, cause the machine to perform operations comprising:

detecting a second annotation for one of the program elements corresponding to the first one of the data type descriptions based on the first annotation not being of interest.

13. The article of manufacture of claim 11, wherein the medium further includes instructions that, when executed by the at least one processor, cause the machine to perform operations comprising:

detecting a second data type description in the serial data stream input based on the program elements of the first one of the data type descriptions not being of interest.

14. The article of manufacture of claim 11, wherein the medium further includes instructions that, when executed by the at least one processor, cause the machine to perform operations comprising:

obtaining an annotated program element of the serial data stream input associated with the annotation value; and including the annotated program element in the output.

15. The article of manufacture of claim 11, wherein the one or more computer files comprise Java class files.

* * * * *